June 1, 1965  N. O. JOHANSSON ETAL  3,186,171
DAMPING DEVICE FOR A SERVO SYSTEM
Filed Jan. 30, 1964  2 Sheets-Sheet 1

INVENTORS
NILS OLOV JOHANSSON
BIRGER ARTHUR EMIL QVARNSTRÖM
BY
ATTORNEYS

June 1, 1965  N. O. JOHANSSON ETAL  3,186,171
DAMPING DEVICE FOR A SERVO SYSTEM
Filed Jan. 30, 1964  2 Sheets-Sheet 2
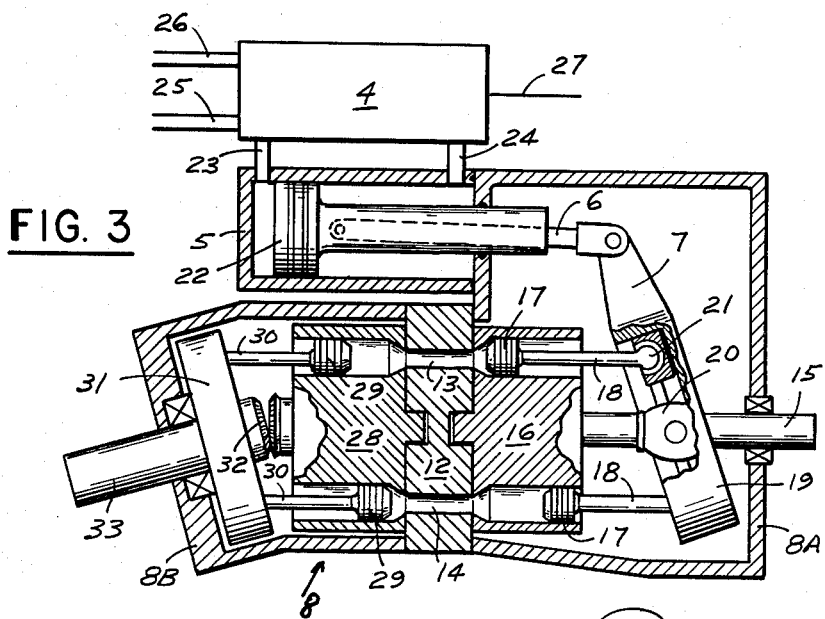
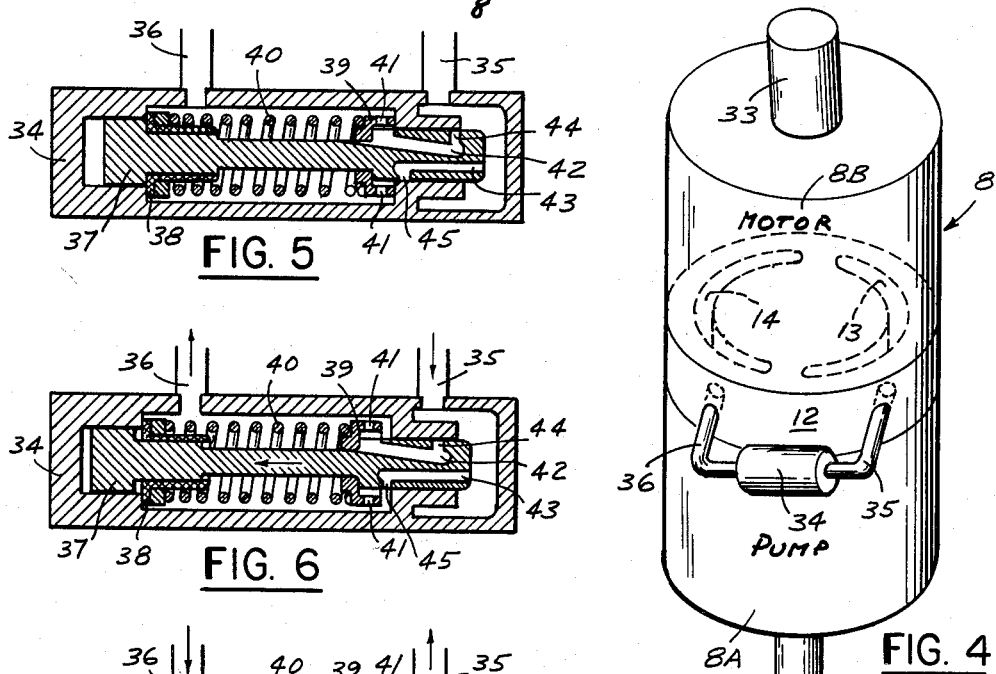
INVENTORS
NILS OLOV JOHANSSON
BIRGER ARTHUR EMIL QVARNSTRÖM
BY
ATTORNEYS United States Patent Office 3,186,171
Patented June 1, 1965

3,186,171
DAMPING DEVICE FOR A SERVO SYSTEM
Nils Olov Johansson, Karlskoga, and Birger Arthur Emil Qvarnström, Hagersten, Sweden, assignors to Aktiebolaget Bofors, Bofors, Sweden, a company of Sweden
Filed Jan. 30, 1964, Ser. No. 341,844
Claims priority, application Sweden, Nov. 18, 1960, 10,095/60
2 Claims. (Cl. 60—53)

This application is a continuation-in-part application of our copending application, Serial No. 152,867, filed November 16, 1961, now abandoned.

The present invention relates to a damping device for a servo system of the type which contains a variable speed gear, the regulating device of which is controlled by impulses from a control device and from a resetting device connected to the output shaft of the gear, said output shaft being connected to a driving machinery having a great moment of inertia, for instance, a laying machinery for a firearm.

In a servo system of the said type, the shafts, bearings, gear wheels, etc. of the driving machinery form a resilient mass which oscillates every time it is actuated. These oscillations are not desirable, and efforts have been made by different means to avoid them. For instance, special stabilizing circuits have been connected in the amplifier unit which usually amplifies the impulses from the regulating device and the resetting device. However, it has been found to be very difficult to obtain complete compensation in this way.

The variable speed gear is often a hydraulic variable speed gear with a pump side and a motor side. In practice, leakage in the parts of the speed gear cannot entirely be avoided and it has been found that a small amount of leakage has a certain capability of dampening oscillations in the system. However, such a leakage has the disadvantage that it is comparatively great in relation to the torque transmission at small torques, where there are hardly any oscillations. At small torques, the leakage therefore causes undesirable sluggishness in the laying system.

The purpose of the present invention is to achieve a damping device which works according to the loss of energy principle and which does not cause sluggishness in the machinery driven by the servo system.

This is achieved according to the invention in that the variable speed gear is provided with a member which, when a high torque is transmitted, causes a loss of energy in the speed gear, but which does not function at small torques.

In the following, the invention will be described in more detail with reference to the attached drawing, in which:

FIG. 3 is an elevational, sectional view of the variable speed gear of the servo system.

FIG. 4 is a perspective detailed view of FIG. 3 on an enlarged scale, and

FIGS. 5, 6 and 7 are sectional views of the regulating means of the servo system in different stages of operation.

Figure 1:
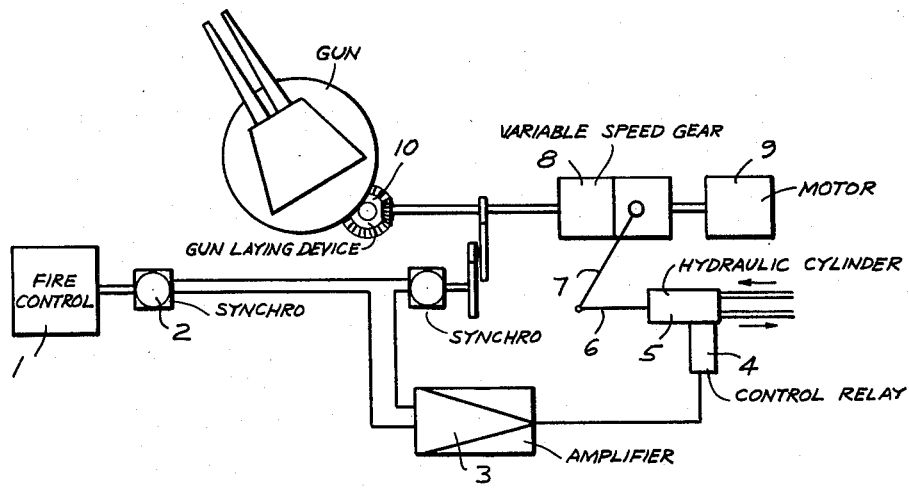
FIG. 1 shows schematically a servo system connected to a fire-control instrument and to the laying machinery of a firearm.

The servo system shown schematically in FIG. 1 is of a conventional type. A fire-control instrument 1 is connected to a synchro 2, which transmits its impulse to an amplifier 3, which controls a relay 4. The relay 4 controls a valve for a hydraulic cylinder 5, in which a movable piston is arranged which is provided with a piston rod 6, which regulates a pilot lever 7 for a variable speed gear 8. The speed gear 8 is connected in the transmission from an electric motor 9 to a driving machinery 10 for a firearm. The output shaft of the speed gear 8 is connected through a transmission to a synchro 11, which sends impulses to the amplifier 3.

In case there is a difference between the angular position at which the fire-control instrument is set and the angular position of the firearm, the synchros 2 and 11 transmit an impulse to the amplifier, which is proportional to the said difference. The relay 4 controls the valve for the cylinder 5 in such a way that the piston rod 6 is moved with a speed which is proportional to the said angular difference. If the regulating arm controls the speed gear in such a way that the output shaft of the speed gear obtains a speed which is proportional to the angular movement of the control lever from a zero position, the laying machinery of the firearm will obtain an acceleration which is proportional to the said angular difference.

When the angular difference is zero, the piston rod 6 will stop moving, and the variable speed gear can work with a constant ratio. The amplifier 3 is provided with conventional stabilizing circuits to prevent backlash in the servo system.

It will be understood that in the system described, resiliency in the driving machinery 10 can cause backlash which is not registered by the synchro 11.

Figure 2:
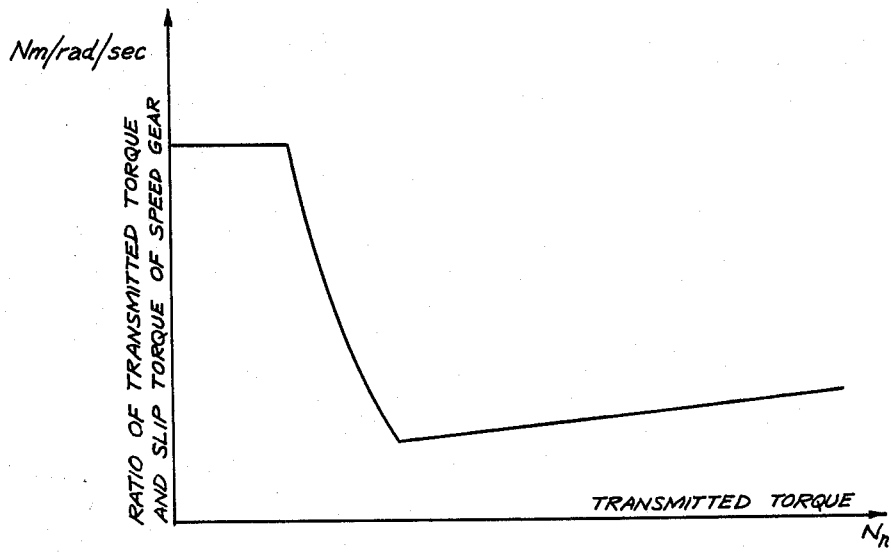
FIG. 2 shows a diagram of the characteristics according to the invention of the speed gear included in the servo system.

According to the invention, such backlash is avoided by giving the speed gear 8 special characteristics, as shown by FIG. 2.

In this figure, the abscissa designates the torque transmitted by the speed gear in Newton metres. The ordinate indicates the ratio between the transmitted torque (in Newton metres) and the slip torque of the speed gear (radians per second).

As shown by the diagram, according to the invention, the said ratio has a high value at low transmitted troques, and a considerably lower value at greater transmitted torques.

If the speed gear 8 is of the hydraulic type, containing a pump part and a motor part, the characteristics can be obtained by a connecting pipe being arranged between the said two parts, which pipe includes a spring-loaded check valve, which opens to allow fluid to pass through the pipe if the pressure in the speed gear—and therewith the torque transmitted by the speed gear—exceeds a predetermined value.

The hydraulic gear 8 is comprised of a variable displacement oil pump 8A and a constant displacement oil motor 8B. These two parts correspond to the two squares of the element 8 in FIG. 1, except that the hydraulic cylinder 5, the piston rod 6 and the pilot lever 7 are directly joined to the gear.

Between the pump 8A and the motor 8B of the gear, a valve plate 12 is provided. In this valve plate 12, two ports 13 and 14 are arranged through which oil can pass between the pump 8A and the motor 8B.

By the constant speed electric motor 9, the drive shaft 15 is rotated with a constant speed and rotates the rotatable pump cylinder block 16 with the pump pistons 17. These pump pistons 17 are through the piston rods 18 connected with a socket ring and swash box 19 by ball joints 21. The box 19 is connected with the drive shaft 15 by a universal joint 20, and can be tilted in relation to the driving shaft 15. The tilting of the box is governed by the pilot lever 7 which, in turn, is actuated through the piston rod 6 by the movement of a movable piston 22. This piston is slideable within the hydraulic cylinder 5 and is controlled as to its position by fluid, such as oil, fed through connection pipes 23, 24, 25 and 26. The flow of oil is controlled by the relay 4 which, in turn, receives impulses through a wire connection 27 to the amplifier 3.

The motor of the gear 8A also comprises a rotatable cylinder block 28 with axially slideable pistons 29 which through piston rods 30 by means of ball joints are connected with a socket ring 31. This socket ring is rotatably arranged on the output shaft 33 and through a pinion 32 connected with the rotatable motor cylinder block 28.

For obtaining the desired effect of the invention, a connection pipe is arranged between the pump and the motor, which pipe includes a spring-loaded check valve 34 which opens to allow oil to pass through the pipe, if the pressure in the speed gear exceeds a predetermined value. This control of the flow of oil is schematically illustrated in FIG. 4. This figure shows how the ports 13 and 14 in the valve plate 12, situated between the pump 8A and the motor 8B, are connected through connection pipes 35 and 36 respectively and spring-loaded check valve 34.

The spring-loaded valve 34 effecting the throttling action may be arranged in any suitable way. It is only essential that the valve opens when the differential in pressure between the pump part and the motor part exceeds a predetermined value.

An exemplification of valve 34 is shown in FIGS. 5, 6 and 7.

FIG. 5 shows the valve in its closed position in which it is when the pressure differential between the pipes 35 and 36 does not exceed the predetermined value. In FIG. 6, the pressure in pipe 35 exceeds the pressure in pipe 36 by more than the aforesaid predetermined value, and as a result, a connection is opened between the said two pipes. In FIG. 7, the pressure in pipe 36 exceeds the pressure in pipe 35 by more than the said predetermined value, and in this case also, a connection is opened between the two pipes.

To effect such control, a plunger 37 is slideably arranged in valve body 34. The plunger is balanced by means of two sleeves 38 and 39 and a spring 40 within said valve body 34. The sleeve 39 is provided with several ports 41. In one end of the plunger 37 there are provided two rather wide bores 42 and 43. The bore 43 is substantially coaxial with the plunger 37, whereas the bore 42 is at a small angle in reference to the axis of symmetry of the plunger and thus will issue into the surface of plunger 37. Perpendicular to the bores 42 and 43, there are two smaller bores 44 and 45 which also issue in the surface of the plunger.

The function of the valve is clearly apparent from FIGS. 5, 6 and 7. In FIG. 5, there is no connection between the two pipes 35 and 36. In FIG. 6, in which there is a sufficient high pressure in pipe 35 in relation to that in pipe 36, the plunger 37 will move to the left, as is indicated by the arrow and a connection via the bores 43 and 45 is opened between the pipes 35 and 36. In FIG. 7, in which the pressure is higher in pipe 36, the plunger moves to the right, as is indicated by the arrow, and as result, there is a connection between pipes 36 and 35 via the ports 41 and the bores 42 and 44. As the bores 44 and 45 are rather small, the valve will have a throttling effect even when it is quite open.

If the speed gear is of an electrical type, containing a motor and a generator, a short-circuiting between the said parts via a resistance can generate the same characteristics for the speed gear.

We claim:

1. A stabilizing device for damping oscillations in a servo system having a pilot and a follower driven by a power drive means and constituting a high inertia load and in which device a variable speed gear means having an input side and an output side is interposed between the pilot and the follower and controlled by signals from the pilot and signals from the output side of said gear means, said stabilizing device comprising regulating means coupled with said gear means for regulating the speed thereof, said regulating means being controlled by the torque transmitted by the power drive means to the follower, and controlling said regulating means so as to cause a loss of torque in said gear in response to a transmitted torque above a predetermined value while remaining inactive below said predetermined value.

2. A servo system having a pilot and a follower driven by a power drive means, said follower constituting an inertia load, said servo comprising a variable speed hydraulic gear means having an input side and an output side and including a pump portion and a motor portion drivingly coupled to each other, the input side of said gear means being coupled to said power driven means and the output side to said follower, speed regulating means for varying the speed of said gear means, first signal means controlled by said pilot and second signal means controlled by the output speed of said gear means, signal comparing means comparing signals generated by the first and second signal means and controlling said speed regulating means corresponding to the differential of the compared signals, a pressure fluid means connected to said motor portion and pressure fluid means connected to said pump portion, conduit means interconnecting said pressure fluid means, and a check valve means included in said conduit means to open and close the same, said check valve means being controlled by the differential fluid pressure in said pressure means so as to open said conduit means in response to a pressure differential above a predetermined value.

References Cited by the Examiner

UNITED STATES PATENTS

| | | | |
|---|---|---|---|
| 2,408,069 | 9/46 | Hull et al. | 60—53 |
| 2,629,226 | 2/53 | Polson | 60—53 |
| 2,871,660 | 2/59 | McDonald et al. | 60—53 |

JULIUS E. WEST, *Primary Examiner.*